United States Patent
Mizuta et al.

(10) Patent No.: US 12,472,696 B2
(45) Date of Patent: Nov. 18, 2025

(54) BONDING METHOD

(71) Applicant: NHK Spring Co., Ltd., Yokohama (JP)

(72) Inventors: Hidetoshi Mizuta, Yokohama (JP);
Atom Furuse, Yokohama (JP); Kaoru Nagasawa, Yokohama (JP); Fumitaka Arai, Yokohama (JP)

(73) Assignee: NHK Spring Co., Ltd., Yokohama (JP)

(*) Notice: Subject to any disclaimer, the term of this patent is extended or adjusted under 35 U.S.C. 154(b) by 47 days.

(21) Appl. No.: 18/684,869

(22) PCT Filed: Oct. 6, 2022

(86) PCT No.: PCT/JP2022/037448
§ 371 (c)(1),
(2) Date: Feb. 20, 2024

(87) PCT Pub. No.: WO2023/063211
PCT Pub. Date: Apr. 20, 2023

(65) Prior Publication Data
US 2024/0342999 A1    Oct. 17, 2024

(30) Foreign Application Priority Data

Oct. 11, 2021  (JP) ................. 2021-167014

(51) Int. Cl.
*B29C 65/14* (2006.01)
*B29C 65/00* (2006.01)

(52) U.S. Cl.
CPC ........ *B29C 65/1416* (2013.01); *B29C 66/742* (2013.01); *B60G 2206/821* (2013.01)

(58) Field of Classification Search
CPC ............. B29C 65/1476; B29C 66/742; B29C 65/1416; B29C 65/02; B29C 65/1412;
(Continued)

(56) References Cited

U.S. PATENT DOCUMENTS 7,041,193 B2 * 5/2006 Bogert ................. F16B 11/008
156/307.3
10,124,646 B2    11/2018 Higuchi et al.
(Continued)

FOREIGN PATENT DOCUMENTS

EP         3495177 A1    6/2019
JP      2006-290313 A   10/2006
(Continued)

OTHER PUBLICATIONS

Supplementary European Search Report mailed Jul. 5, 2024, issued for EP22880906.7.
(Continued)

*Primary Examiner* — Vishal I Patel
(74) *Attorney, Agent, or Firm* — Troutman Pepper Locke LLP

(57) ABSTRACT

A bonding method bonds a buffer member to an adherend member, and includes: an adhesive application step of applying an adhesive to a part of the buffer member, the part being bonded to the adherend member; a first heating step of heating a part of the adherend member, the part being bonded to the buffer member; a second heating step of heating the part of the adherend member after the first heating step; and an attachment step of attaching the buffer member to the adherend member after the second heating step.

8 Claims, 11 Drawing Sheets

(58) Field of Classification Search
CPC ............ B29C 2035/0822; B29C 65/46; B29C 66/0242; B29C 66/028; B60G 2206/821; B60G 21/055

See application file for complete search history.

(56) References Cited

U.S. PATENT DOCUMENTS

2016/0257178 A1* 9/2016 Higuchi ............ B29C 66/91443
2017/0312988 A1* 11/2017 Kuroda ............... B29C 66/1122

FOREIGN PATENT DOCUMENTS

| | | |
|---|---|---|
| JP | 2016-84072 A | 5/2016 |
| JP | 2018-34666 A | 3/2018 |
| JP | 2018-87010 A | 6/2018 |
| JP | 6542516 B2 | 7/2019 |
| JP | 6832312 B2 | 2/2021 |
| KR | 10-2017-0103226 A | 9/2017 |

OTHER PUBLICATIONS

Office Action dated Jun. 24, 2025, issued for the corresponding Japanese patent application No. 2021-167014 and machine English translation thereof.

* cited by examiner

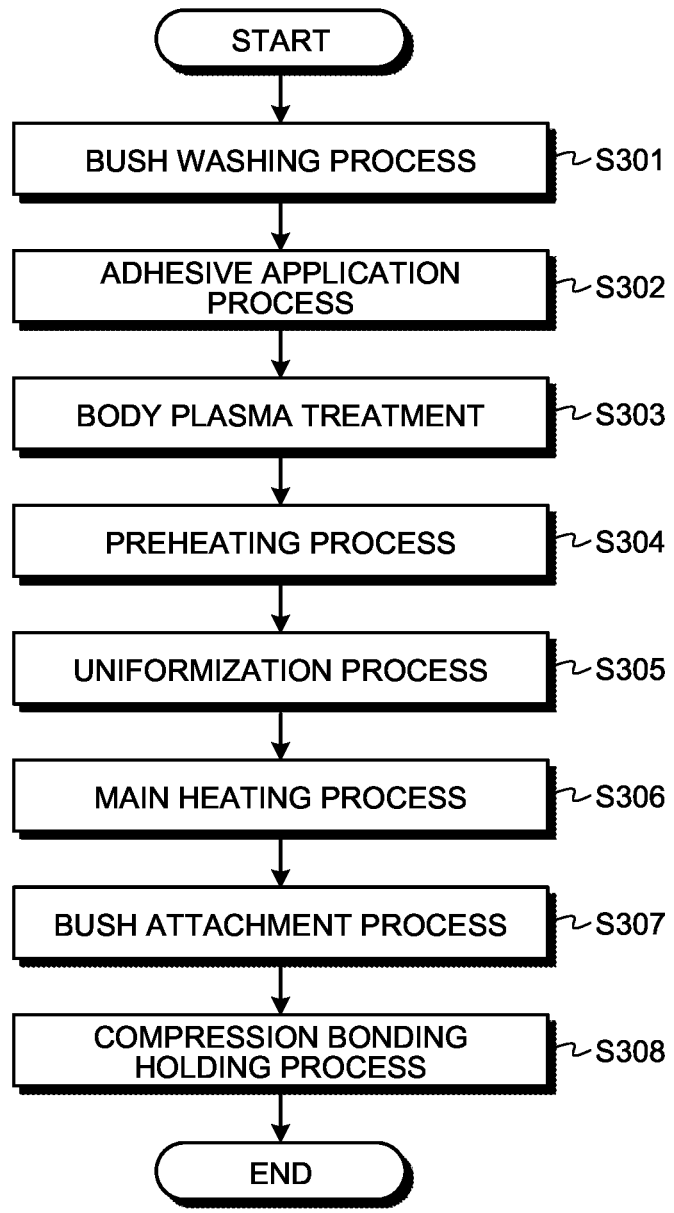

BONDING METHOD

FIELD

The present invention relates to a bonding method.

BACKGROUND

Stabilizers used in vehicles, for example, are mounted in the vehicles and stabilize postures of the vehicles. A bush serving as a buffer member that buffers collisions between a stabilizer and the body of a vehicle, for example, is provided at a joint between the stabilizer and the body, and the stabilizer and the body of the vehicle are coupled to each other via the bush. The bush is formed using an elastic member, such as rubber, and reduces transmission of vibration of the stabilizer to the body. In general, the bush is made of two members and is attached to the stabilizer by vulcanization bonding after an adhesive is applied to a contact surface of an adherend member, the stabilizer (see, for example, Patent Literature 1). In the vulcanization bonding, part of the stabilizer is heated, the part being where the bush is to be bonded. In a heating method therefor, an induction heating coil is adopted, for example (see, Patent Literature 2, for example).

CITATION LIST

Patent Literature

Patent Literature 1: Japanese Patent No. 6542516
Patent Literature 2: Japanese Patent No. 6832312

SUMMARY

Technical Problem

The temperature of the stabilizer due to the heating depends largely on the outside temperature and the heating time has thus needed to be changed for each season, for example. Such readjustment of the heating condition has led to increase in the number of operation steps and operating time and thus to reduction in the productivity.

The present invention has been made in view of the above and an object thereof is to provide a bonding method that unfailingly enables a buffer member to be bonded to an adherend member regardless of outside temperature while minimizing reduction in productivity.

Solution to Problem

To solve the above-described problem and achieve the object, a bonding method according to the present invention for bonding a buffer member to an adherend member includes: an adhesive application step of applying an adhesive to a part of the buffer member, the part being bonded to the adherend member; a first heating step of heating a part of the adherend member, the part being bonded to the buffer member; a second heating step of heating the part of the adherend member after the first heating step; and an attachment step of attaching the buffer member to the adherend member after the second heating step.

Moreover, the above-described bonding method according to the present invention further includes a surface treatment step of performing surface treatment to the adherend member before the second heating step.

Moreover, the above-described bonding method according to the present invention further includes a uniformization step of uniformizing a temperature of the adherend member after the first heating step.

Moreover, in the above-described bonding method according to the present invention, the first heating step includes heating the adherend member using a near-infrared lamp, and the second heating step includes heating the adherend member by induction heating.

Advantageous Effects of Invention

The present invention has an effect of unfailingly enabling a buffer member to be bonded to a stabilizer regardless of outside temperature while minimizing reduction in productivity.

BRIEF DESCRIPTION OF DRAWINGS

FIG. 18 is a flowchart illustrating a flow of a bush bonding process, according to a third embodiment.

DESCRIPTION OF EMBODIMENTS

Modes (hereinafter, referred to as "embodiments") for implementing the present invention will hereinafter be described by reference to the appended drawings. The drawings are schematic, a relation between a thickness and a width of each portion and ratios among thicknesses of respective portions may be different from the actual relation and ratios, and the drawings may also include a portion that differs in its dimensional relations or ratios among the drawings.

First Embodiment

Figure 1:
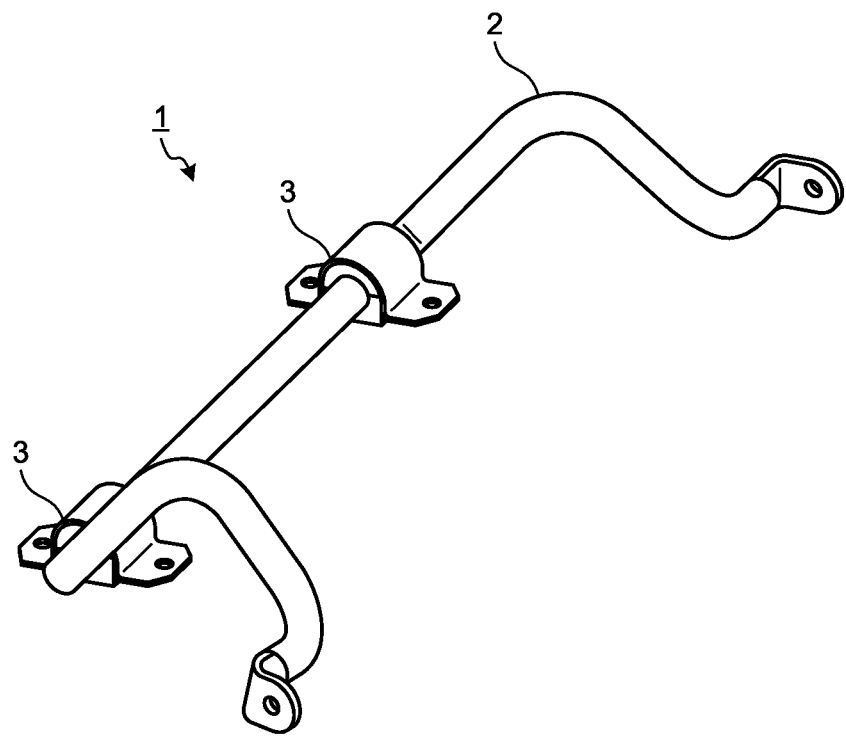
FIG. 1 is a perspective view of an example of a stabilizer manufactured, in a first embodiment of the present invention.
Figure 2:
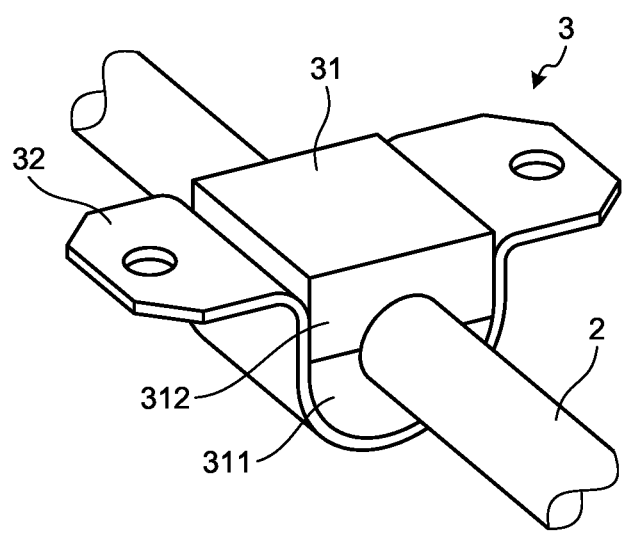
FIG. 2 is a diagram illustrating a configuration of the stabilizer illustrated in FIG. 1, the configuration being near a bush member.

FIG. 1 is a perspective view of an example of a stabilizer manufactured, in a first embodiment of the present invention. FIG. 2 is a diagram illustrating a configuration of the stabilizer illustrated in FIG. 1, the configuration being near a bush member. A stabilizer 1 has a body portion 2 bent at both ends thereof and linearly extending at a central portion thereof, and a bush member 3 attached to the body portion 2.

The body portion 2 extends in a columnar shape, for example, a cylindrical shape, and is bent at both end portions thereof. The body portion 2 may be solid or may be hollow. The body portion 2 is formed of any of: metals and various types of fiber (for example, carbon fiber).

In a case where the stabilizer 1 is provided in an automobile, for example, one of end portions of the stabilizer 1 is connected to one of suspensions arranged to right and left and the other one of the end portions is connected to the other one of the suspensions. These end portions are then fixed to the suspensions via through holes. Furthermore, the stabilizer 1 is fixed also to the body of the automobile via the bush member 3.

The stabilizer 1 is manufactured by processing of a base material. For example, after a base material that is column-shaped is bent, pressure is applied to both end portions of the base material so that the end portions become plate-shaped, and through holes are then formed in the end portions.

The bush member 3 has a bush 31 and a bracket 32.

The bracket 32 is attached to the body of the automobile via, for example, screws, and supports the body portion 2 via the bush 31.

The bush 31 is formed using an elastic material, such as rubber or a resin having elasticity, and functions as a buffer member that buffers collisions between the stabilizer 1 and the body, for example. The bush 31 includes two members (a first member 311 and a second member 312). The bush 31 is formed by bonding of the first member 311 and second member 312 to the body portion 2, with the body portion 2 interposed between the first member 311 and second member 312.

Figure 3:
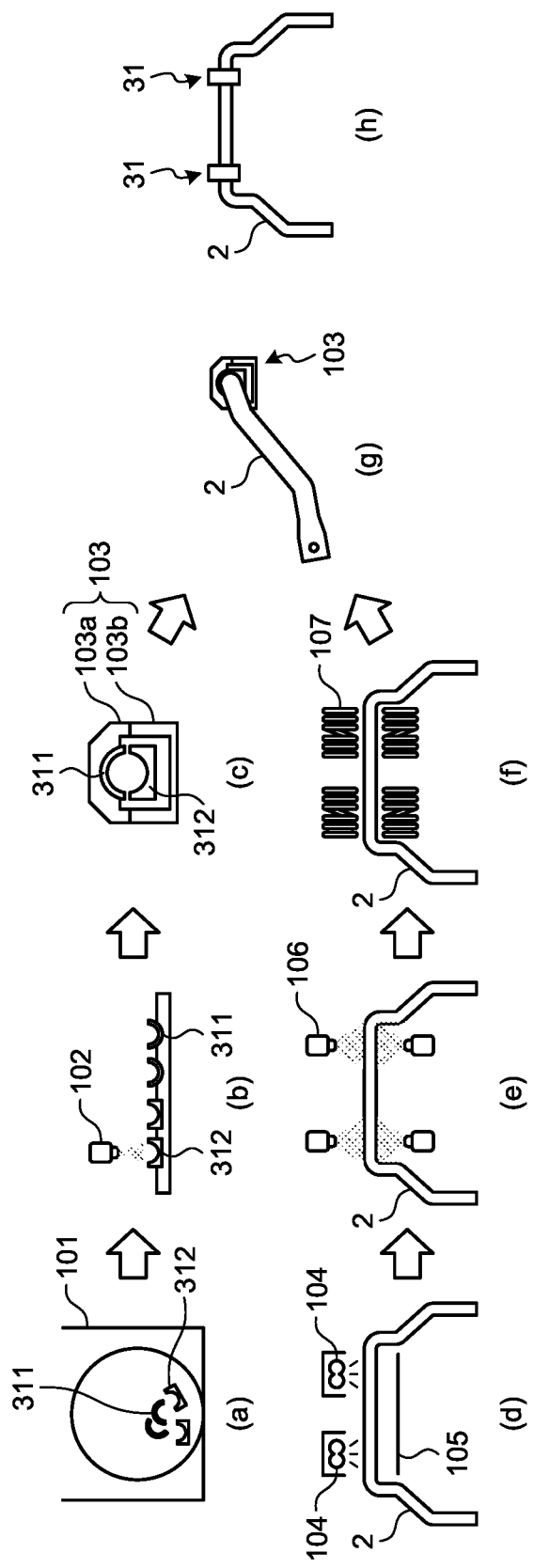
FIG. 3 is a diagram illustrating a bush bonding process for the stabilizer illustrated in FIG. 1.
Figure 4:
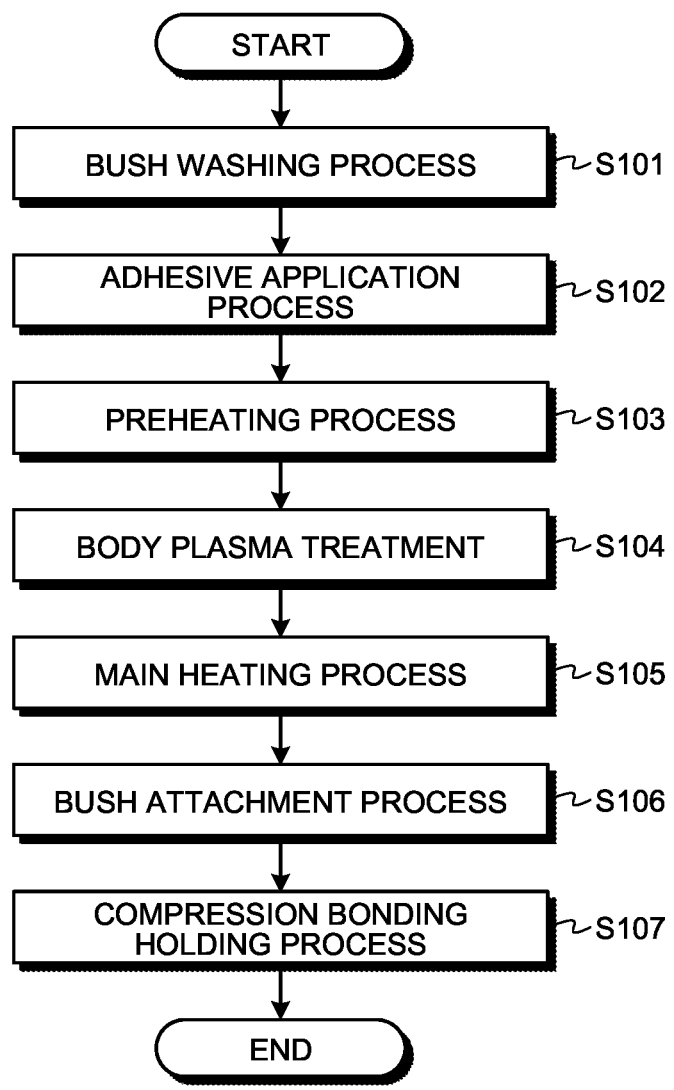
FIG. 4 is a flowchart illustrating a flow of the bush bonding process, according to the first embodiment.

A bonding process of bonding the above described bush 31 to the body portion 2 will be described next by reference to FIG. 3 to FIG. 8. FIG. 3 is a diagram illustrating the bush bonding process for the stabilizer illustrated in FIG. 1. FIG. 4 is a flowchart illustrating a flow of the bush bonding process, according to the first embodiment.

Firstly, the bush 31 is washed (Step S101). For example, as illustrated by (a) in FIG. 3, the first member 311 and second member 312 of the bush 31 are washed by a washer 101. After being washed, the first member 311 and the second member 312 are subjected to a drying process.

After the washing process, an adhesive is applied to the first member 311 and second member 312 (Step S102: an adhesive application step). For example, as illustrated by (b) in FIG. 3, the adhesive is applied, through a nozzle 102, to surfaces of the first member 311 and second member 312, the surfaces being where the body portion is to be bonded to. After the application of the adhesive, the first member 311 and the second member 312 are subjected to a drying process. Thereafter, the first member 311 and the second member 312 are set in a jig 103. The jig 103 includes, for example, a first jig 103a to hold the first member 311 and a second jig 103b to hold the second member 312.

Figure 5:
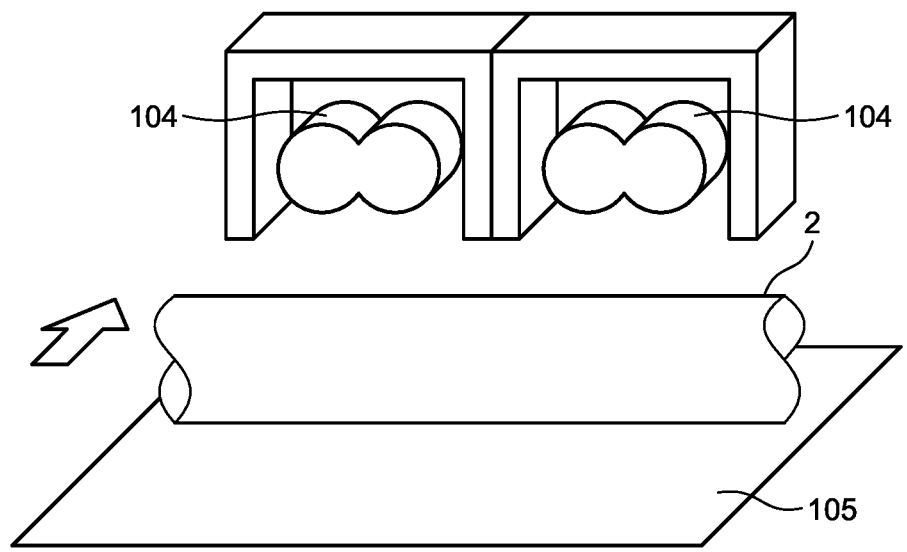
FIG. 5 is a diagram illustrating a bush preheating process.
Figure 6:
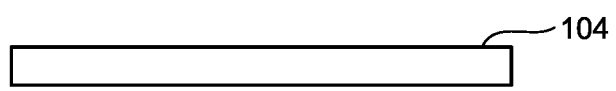
FIG. 6 is a diagram (No. 1) illustrating arrangement of heaters and a reflective plate.
Figure 6:
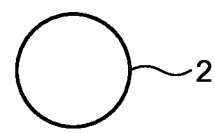
Figure 6:
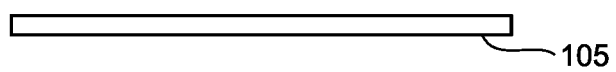
Figure 7:
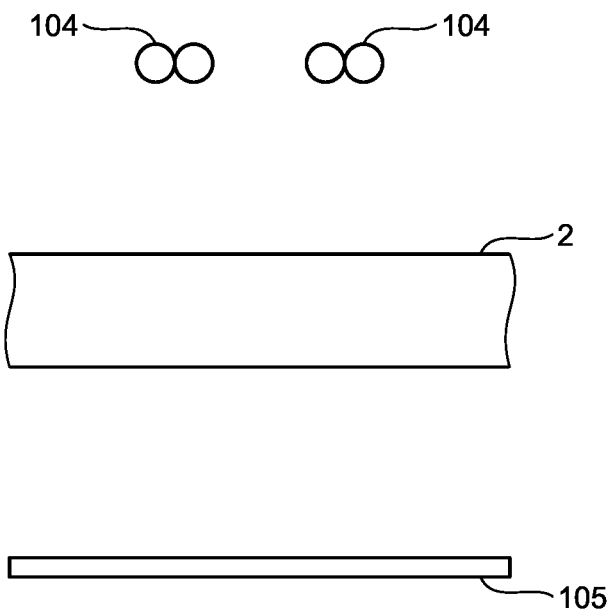
FIG. 7 is a diagram (No. 2) illustrating the arrangement of the heaters and the reflective plate.

As to the body portion 2, a preheating process for part of the body portion 2 is performed, the part being where the bush 31 is to be bonded to (Step S103: a first heating step, see (d) in FIG. 3). FIG. 5 is a diagram illustrating a bush preheating process. FIG. 6 and FIG. 7 are diagrams illustrating arrangement of heaters and a reflective plate. FIG. 6 is a diagram of heated part of the body portion 2, the heated part being viewed in a longitudinal direction of the heated part. FIG. 7 is a diagram of the heated part of the body portion 2, the heated part being viewed in a direction perpendicular to the longitudinal direction of the heated part, the direction being in a longitudinal direction of near-infrared lamps.

In this first embodiment, the body portion 2 is preheated using two near-infrared lamps 104 that emit near-infrared rays and a reflective plate 105. The near-infrared lamps 104 extend perpendicularly to the longitudinal direction of the heated part of the body portion 2 and are provided on the same side of the body portion 2. Furthermore, the reflective plate 105 has a reflective surface that reflects heat and light and the reflective plate 105 is provided at a position where the reflective surface is opposed to the near-infrared lamps 104, with the body portion 2 therebetween. In the preheating process, the heated part of the body portion 2 is irradiated with near-infrared rays from the near-infrared lamps 104 and opposite part of the body portion 2 is irradiated with the near-infrared rays reflected by the reflective plate 105, the opposite part being on the opposite side of the body portion 2, the opposite side being opposite to the side toward the near-infrared lamps 104.

After the preheating process, the body portion 2 is subjected to plasma treatment (Step S104: a surface treatment step). The body portion 2 is subjected to surface treatment through the plasma treatment. For example, as illustrated by (e) in FIG. 3, a surface of the body portion 2 is subjected to the plasma treatment by means of plasma nozzles 106. For example, the plasma treatment may be performed in an unheated space at normal temperature or may be performed in a space that has been heated to room temperature or higher.

After the plasma treatment, the body portion 2 is subjected to a main heating process (Step S105: a second heating step). For this main heating process, for example, induction heating (IH) is used. For example, as illustrated by (f) in FIG. 3, the part of the body portion 2 is heated by IH coils 107, the part being where the the bush 31 is to be bonded to. For example, in the main heating process, the body portion 2 is heated for about a few tens of seconds. Temperatures for the main heating process and heating process are set as appropriate, depending on the types of the bush 31 and adhesive. In contrast to a target temperature to be reached in the main heating process, a target temperature to be reached for the body portion 2 in the preheating process is set to, for example, a temperature higher than room temperature (outside temperature) and 30% of the main heating target temperature or higher and 90% of the main heating target temperature or lower. In the main heating process, for example, the target temperature for the heated part is set to a temperature ranging from 150° C. to 300° C.

Figure 8:
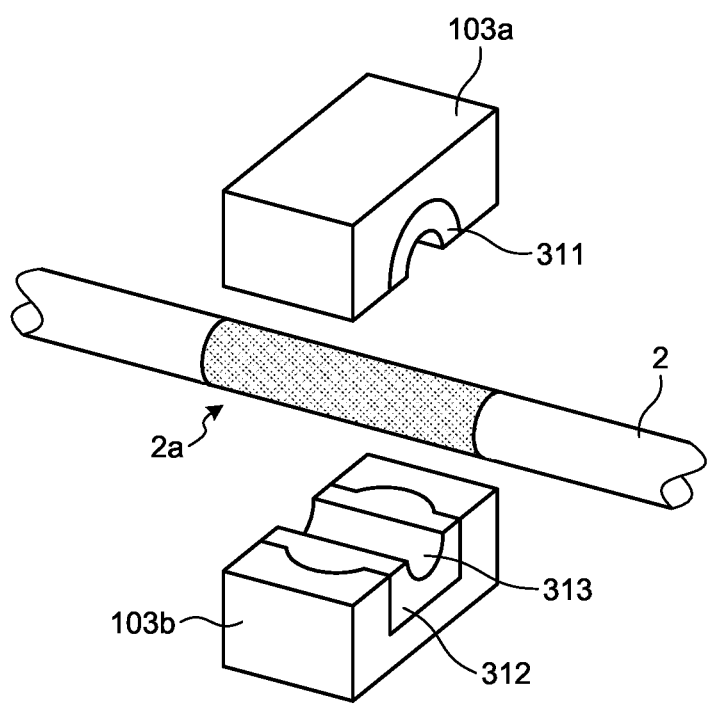
FIG. 8 is a diagram illustrating the bush bonding process.

In a state where the first member 311 and the second member 312 have been set in the jig 103 and the body portion 2 has been subjected to the main heating process, a bush attachment process is performed (Step S106: see (g) in FIG. 3). FIG. 8 is a diagram illustrating a bush bonding process. As illustrated in FIG. 8, the first jig 103a holding the first member 311 and the second jig 103b holding the second member 312 are attached to heated part 2a of the body portion 2. An adhesive 313 has already been applied to part of the first member 311 and second member 312, the part being part to be bonded to the body portion 2.

After the jig 103 has been attached to the body portion 2, a compression bonding holding process for bonding the bush 31 to the body portion 2 is performed (Step S107). The compression bonding holding process is maintained in the attached state until vulcanization bonding is completed, for example. In this state, the body portion 2 and the bush 31 are bonded to each other by heat in the body portion 2 and pressure.

Thereafter, the first jig 103a is removed from the first member 311, the second jig 103b is removed from the second member 312, and the stabilizer 1 having the bush 31 firmly fixed to the body portion 2 is thereby obtained (see (h) in FIG. 3).

Because the preheating process for preliminarily heating the part of the body portion 2 is performed before the main heating process, the part being where the bush 31 is to be bonded to, the above described first embodiment of the present invention enables the heated part to be heated to a high temperature in the main heating by the preheating before the main heating. The first embodiment unfailingly enables the bush 31 to be bonded to the stabilizer regardless of the outside temperature while minimizing reduction in the productivity.

Furthermore, the first embodiment unfailingly enables the body portion 2 to be heated because the preheating process is performed using near-infrared rays high in heat transfer efficiency.

First Modified Example of First Embodiment

Figure 9:
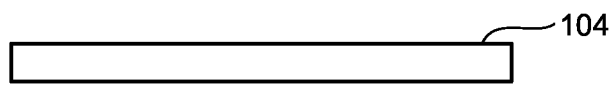
FIG. 9 is a diagram (No. 1) illustrating arrangement of a heater and a reflective plate, according to a first modified example of the first embodiment.
Figure 9:
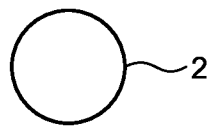
Figure 9:
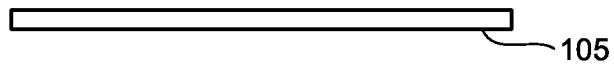
Figure 10:
FIG. 10 is a diagram (No. 2) illustrating the arrangement of the heater and the reflective plate, according to the first modified example of the first embodiment.
Figure 10:
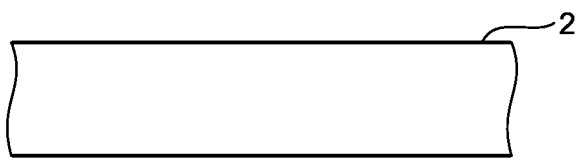
Figure 10:
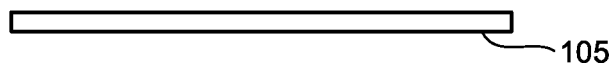

A first modified example of the first embodiment of the present invention will be described next by reference to FIG. 9 and FIG. 10. FIG. 9 and FIG. 10 are diagrams illustrating arrangement of a heater and a reflective plate, according to the first modified example of the first embodiment. FIG. 9 is a diagram of heated part of the body portion 2, the heated part being viewed in a longitudinal direction of the heated part. FIG. 10 is a diagram of the heated part of the body portion 2, the heated part being viewed in a direction perpendicular to the longitudinal direction of the heated part, the direction being in a longitudinal direction of a near-infrared lamp.

In this first modified example, the body portion 2 is preheated using one near-infrared lamp 104 that emits near-infrared rays and the reflective plate 105. The near-infrared lamp 104 is provided above the heated part of the body portion 2. Furthermore, the reflective plate 105 is provided at a position where its reflective surface is opposed to the near-infrared lamp 104, with the body portion 2 therebetween. In a preheating process, the heated part of the body portion 2 is irradiated with near-infrared rays from the near-infrared lamp 104 and opposite part of the body portion 2 is irradiated with the near-infrared rays reflected by the reflective plate 105, the opposite part being on the opposite side of the body portion 2, the opposite side being opposite to the side toward the near-infrared lamp 104.

Even in a case where the number of near-infrared lamps 104 is one like in this first modified example, performing the preheating process for preliminarily heating the part of the body portion 2 before a main heating process unfailingly enables the bush 31 to be bonded to the stabilizer regardless of the outside temperature, the part being where the bush 31 is to be bonded to.

Second Modified Example of First Embodiment

Figure 11:
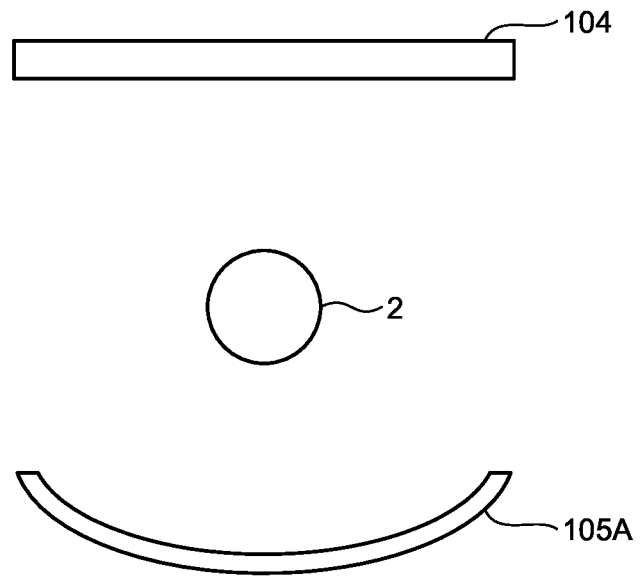
FIG. 11 is a diagram (No. 1) illustrating arrangement of heaters and a reflective plate, according to a second modified example of the first embodiment.
Figure 12:
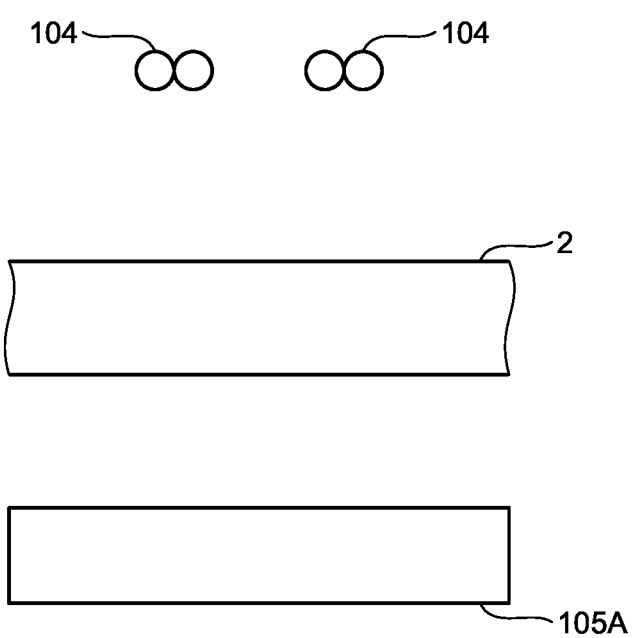
FIG. 12 is a diagram (No. 2) illustrating the arrangement of the heaters and the reflective plate, according to the second modified example of the first embodiment.

A second modified example of the first embodiment of the present invention will be described next by reference to FIG. 11 and FIG. 12. FIG. 11 and FIG. 12 are diagrams illustrating arrangement of heaters and a reflective plate, according to the second modified example of the first embodiment. FIG. 11 is a diagram of heated part of the body portion 2, the heated part being viewed in a longitudinal direction of the heated part. FIG. 12 is a diagram of the heated part of the body portion 2, the heated part being viewed in a direction perpendicular to the longitudinal direction of the heated part, the direction being in a longitudinal direction of near-infrared lamps. In this second modified example, a reflective plate 105A is included, instead of the reflective plate 105 of the first embodiment.

The reflective plate 105A has a reflective surface curved concavely and is provided at a position where the reflective surface is opposed to the near-infrared lamps 104, with the body portion 2 therebetween. In a preheating process, the heated part of the body portion 2 is irradiated with near-infrared rays from the near-infrared lamps 104 and opposite part of the body portion 2 is irradiated with the near-infrared rays reflected by the reflective plate 105A, the opposite part being on the opposite side of the body portion 2, the opposite side being opposite to the side toward the near-infrared lamps 104. Because the reflective surface is curved and the near-infrared rays are reflected to be directed to the body portion 2, the body portion 2 is able to be heated even more efficiently in this preheating process.

Similarly to the first embodiment, performing the preheating process for preliminarily heating the part of the body portion 2 before a main heating process in the second modified example unfailingly enables the bush 31 to be bonded to the stabilizer regardless of the outside temperature, the part being where the bush 31 is to be bonded to.

Furthermore, having the concave reflective surface of the reflective plate 105A to cause the reflected near-infrared rays to concentrate in the body portion 2 in this second modified example enables the opposite side of the body portion 2 to be heated even more unfailingly, the opposite side being opposite to the side toward the near-infrared lamps 104.

Third Modified Example of First Embodiment

Figure 13:
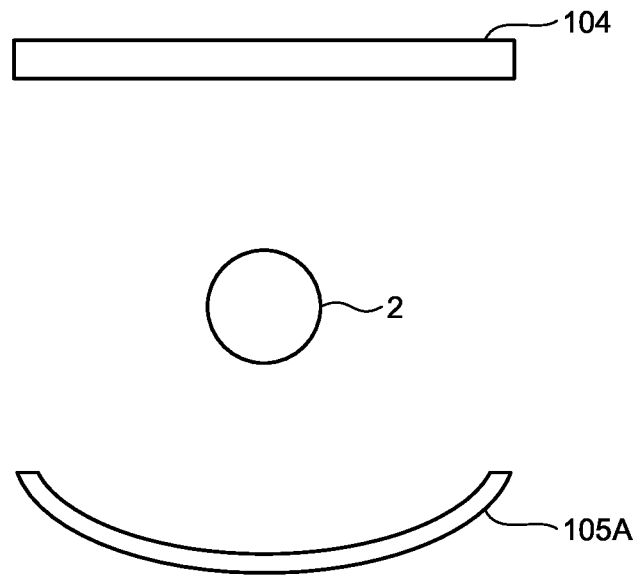
FIG. 13 is a diagram (No. 1) illustrating arrangement of a heater and a reflective plate, according to a third modified example of the first embodiment.
Figure 14:
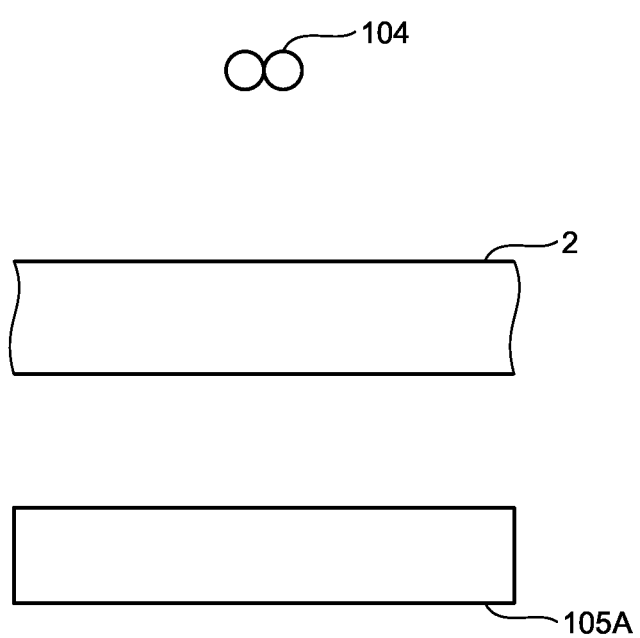
FIG. 14 is a diagram (No. 2) illustrating the arrangement of the heater and the reflective plate, according to the third modified example of the first embodiment.

A third modified example of the first embodiment of the present invention will be described next by reference to FIG. 13 and FIG. 14. FIG. 13 and FIG. 14 are diagrams illustrating arrangement of a heater and a reflective plate, according to the third modified example of the first embodiment. FIG. 13 is a diagram of heated part of the body portion 2, the heated part being viewed in a longitudinal direction of the heated part. FIG. 14 is a diagram of the heated part of the body portion 2, the heated part being viewed in a direction perpendicular to the longitudinal direction of the heated part, the direction being in a longitudinal direction of a near-infrared lamp.

In this third modified example, the body portion 2 is preheated using one near-infrared lamp 104 that emits near-infrared rays and the reflective plate 105A. The near-infrared lamp 104 is provided above the heated part of the body portion 2. Furthermore, the reflective plate 105A is provided at a position where its reflective surface is opposed to the near-infrared lamp 104, with the body portion 2 therebetween. In a preheating process, the heated part of the body portion 2 is irradiated with near-infrared rays from the near-infrared lamp 104 and opposite part of the body portion 2 is irradiated with the near-infrared rays reflected by the reflective plate 105A, the opposite part being on the opposite side of the body portion 2, the opposite side being opposite to the side toward the near-infrared lamp 104.

Even in a case where the number of near-infrared lamps 104 is one like in this third modified example, performing the preheating process for preliminarily heating the part of the body portion 2 before a main heating process unfailingly enables the bush 31 to be bonded to the stabilizer regardless of the outside temperature, the part being where the bush 31 is to be bonded to.

Furthermore, similarly to the second modified example, having the concave reflective surface of the reflective plate 105A to cause the reflected near-infrared rays to concentrate in the body portion 2 in this third modified example enables the opposite side of the body portion 2 to be heated even more unfailingly, the opposite side being opposite to the side toward the near-infrared lamp 104.

Fourth Modified Example of First Embodiment

Figure 15:
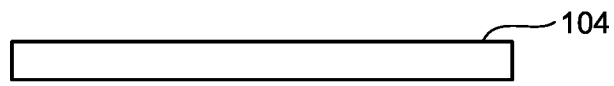
FIG. 15 is a diagram (No. 1) illustrating arrangement of heaters, according to a fourth modified example of the first embodiment.
Figure 15:
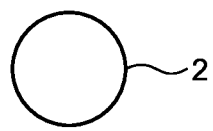
Figure 15:
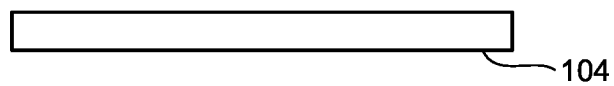
Figure 16:
FIG. 16 is a diagram (No. 2) illustrating the arrangement of the heaters, according to the fourth modified example of the first embodiment.
Figure 16:
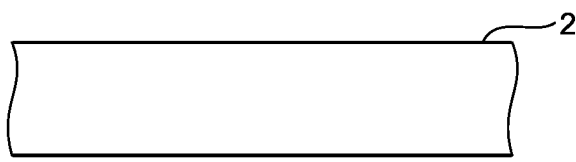
Figure 16:

A fourth modified example of the first embodiment of the present invention will be described next by reference to FIG. 15 and FIG. 16. FIG. 15 and FIG. 16 are diagrams illustrating arrangement of heaters, according to the fourth modified example of the first embodiment. FIG. 15 is a diagram of heated part of the body portion 2, the heated part being viewed in a longitudinal direction of the heated part. FIG. 16 is a diagram of the heated part of the body portion 2, the heated part being viewed in a direction perpendicular to the longitudinal direction of the heated part, the direction being in a longitudinal direction of near-infrared lamps. In this fourth modified example, two near-infrared lamps 104 are included, instead of the reflective plate 105 of the first embodiment.

In this fourth modified example, the four near-infrared lamps 104 are arranged in groups of two such that the groups are opposed to each other, with the body portion 2 between the groups of two. In a preheating process, heated part of the body portion 2 is irradiated with near-infrared rays from the near-infrared lamps 104 from both sides of the heated part.

Similarly to the first embodiment, performing the preheating process for preliminarily heating the part of the body portion 2 before a main heating process in this fourth modified example unfailingly enables the bush 31 to be bonded to the stabilizer regardless of the outside temperature, the part being where the bush 31 is to be bonded to.

Furthermore, the body portion 2 is able to be heated even more unfailingly by the near-infrared lamp 104 arranged at positions opposed to each other with the body portion 2 between these positions.

Second Embodiment

Figure 17:
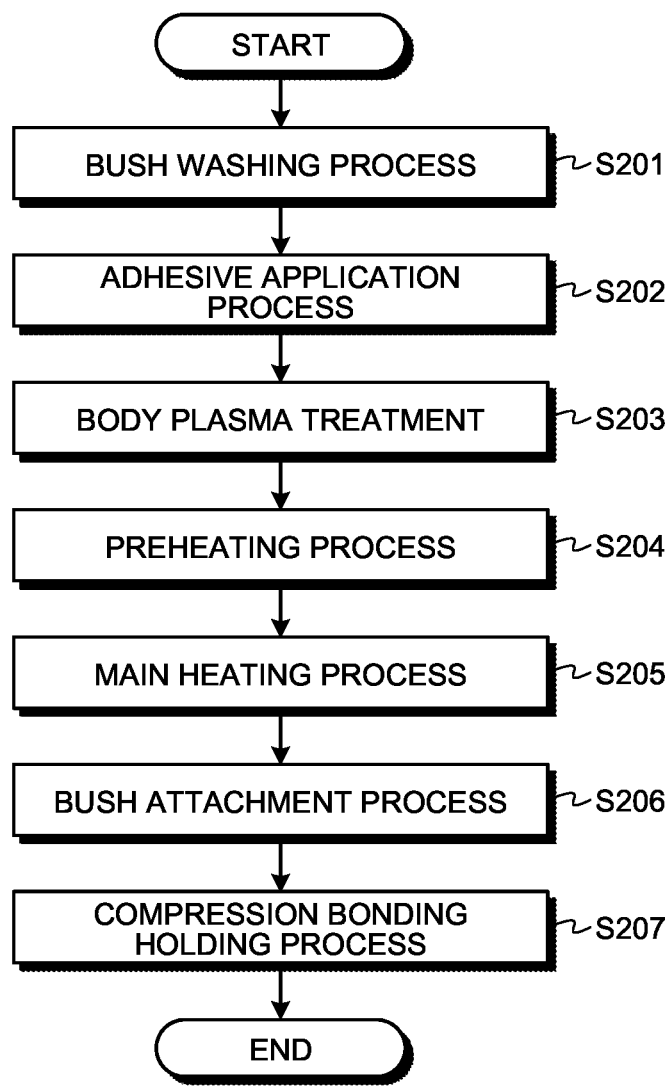
FIG. 17 is a flowchart illustrating a flow of a bush bonding process, according to a second embodiment.

A second embodiment of the present invention will be described next by reference to FIG. 17. FIG. 17 is a flowchart illustrating a flow of a bush bonding process, according to the second embodiment. The stabilizer 1 according to the second embodiment has the same configuration as the first embodiment. A bonding method for the bush 31, according to the second embodiment will be described hereinafter.

In the bonding method according to the second embodiment, similarly to Steps S101 and S102 in FIG. 4 described above, the bush 31 is washed (Step S201) and an adhesive is applied to the first member 311 and the second member 312 (Step S202).

As to the body portion 2, plasma treatment of the body portion 2 is performed (Step S203). The body portion 2 is subjected to surface treatment through the plasma treatment (see, for example, (e) in FIG. 3).

After the plasma treatment, the body portion 2 is preheated (Step S204). For example, as illustrated by (d) in FIG. 3, for example, part of the body portion 2 is heated using the two near-infrared lamps 104 that emit near-infrared rays and the reflective plate 105, the part being where the bush 31 is to be bonded to.

After the preheating process, similarly to Steps S105 to S107 in FIG. 4 described above, the body portion 2 is subjected to a main heating process (Step S205), a bush attachment process is performed with the first member 311 and the second member 312 set in the jig 103 (Step S206), and a compression bonding holding process for bonding the bush 31 to the body portion 2 is performed (Step S207).

Thereafter, the first jig 103a is removed from the first member 311, the second jig 103b is removed from the second member 312, and compression bonding of the bush 31 to the body portion 2 is thereby completed.

Similarly to the first embodiment, the above described second embodiment of the present invention enables the heated part to be heated to a high temperature in the main heating regardless of the outside temperature, because the preheating process for preliminarily heating the part of the body portion 2 before the main heating process is performed, the part being where the bush 31 is to be bonded to. The second embodiment unfailingly enables the bush 31 to be bonded to the stabilizer regardless of the outside temperature.

In this second embodiment of the present invention, the preheating process and main heating process are successively performed but heating the body portion 2 by the preheating process without temperature monitoring and heating the body portion 2 with the temperature monitored in the main heating process enable heating efficiently and unfailingly.

Third Embodiment

A third embodiment of the present invention will be described next by reference to FIG. 18. FIG. 18 is a flowchart illustrating a flow of a bush bonding process, according to the third embodiment. The stabilizer 1 according to the third embodiment has the same configuration as the first embodiment. A bonding method for the bush 31, according to the third embodiment will be described hereinafter.

In the bonding method according to the third embodiment, similarly to Steps S201 to S204 in FIG. 17 described above, the bush 31 is washed (Step S301), an adhesive is applied to the first member 311 and second member 312 (Step S302), the body portion 2 is subjected to plasma treatment (Step S303), and the body portion 2 is subjected to a preheating process (Step S304).

Uniformization of heated part of the body portion 2 is performed after the preheating process (Step S305: a uniformization step). In the uniformization process, the temperature of part where the bush is to be bonded to is uniformized by leaving the heated part to stand.

After the uniformization process, similarly to Steps S205 to S207 in FIG. 17 described above, the body portion 2 is subjected to a main heating process (Step S306), a bush attachment process is performed with the first member 311 and second member 312 set in the jig 103 (Step S307), and a compression bonding holding process for bonding the bush 31 to the body portion 2 is performed (Step S308).

Thereafter, the first jig 103a is removed from the first member 311, the second jig 103b is removed from the second member 312, and compression bonding of the bush 31 to the body portion 2 is thereby completed.

Similarly to the first and second embodiments, the above described third embodiment of the present invention enables the heated part to be heated to a high temperature in the main heating regardless of the outside temperature, because the preheating process for preliminarily heating the part of the body portion 2 before the main heating process is performed, the part being where the bush 31 is to be bonded to. The third embodiment unfailingly enables the bush 31 to be bonded to the stabilizer regardless of the outside temperature.

Furthermore, the third embodiment enables reduction in non-uniformity of the temperature of the part where the bush is to be bonded to, because the heat uniformization process is performed between the preheating process and the main heating process.

In a case where the body plasma treatment is performed in the uniformization process in this third embodiment, the treatment time for the body plasma treatment of the first embodiment (FIG. 4: Step S104) may be adjusted to the time needed for the uniformization.

Modes for implementing the present invention have been described thus far, but the present invention is not to be limited only to the above described embodiments. For example, the present invention is applicable to products manufactured by a thermocompression bonding process.

Furthermore, in the examples described above with respect to the embodiments, near-infrared lamps are used as heating members for the preheating process and IH coils are used as heating members for the main heating process, but the heating members are not limited to these examples, and any publicly known means (for example, heating by electric conduction or heating by use of hot air) may be used and selected as appropriate according to the heating efficiency, for example.

Furthermore, in the examples described above with respect to the embodiments, a bush to be coupled to the body of a vehicle is bonded to a stabilizer, but without being limited to stabilizers, any adherend member that a buffer member is to be bonded to by heating is applicable, the buffer member being between the adherend member and a coupling target and being for buffering collisions between these coupling targets, for example. Examples of the adherend member include, in addition to stabilizers, spiral springs, leaf springs, torsion bars, and disc springs. For example, an insulator is used as a buffer member for a spiral spring.

The present invention may thus include various embodiments not described herein, and various design changes, for example, may be made without departing from the technical ideas determined by the claims.

INDUSTRIAL APPLICABILITY

As described hereinbefore, a bonding method according to the present invention is suitable for unfailingly bonding a buffer member to an adherend member regardless of outside temperature while minimizing reduction in productivity.

REFERENCE SIGNS LIST

1 STABILIZER
2 BODY PORTION
3 BUSH MEMBER
31 BUSH
32 BRACKET
101 WASHER
102 NOZZLE
103 JIG
103a FIRST JIG
103b SECOND JIG
104 NEAR-INFRARED LAMP
105, 105A REFLECTIVE PLATE
106 PLASMA NOZZLE
107 IH COIL
311 FIRST MEMBER
312 SECOND MEMBER

The invention claimed is:

1. A bonding method for bonding a buffer member to an adherend member, the bonding method comprising:
an adhesive application step of applying an adhesive to a part of the buffer member, the part being bonded to the adherend member;
a first heating step of heating a part of the adherend member, the part being bonded to the buffer member;
a second heating step of heating the part of the adherend member after the first heating step; and
an attachment step of attaching the buffer member to the adherend member after the second heating step.

2. The bonding method according to claim 1, further comprising a surface treatment step of performing surface treatment to the adherend member before the second heating step.

3. The bonding method according to claim 1, further comprising a uniformization step of uniformizing a temperature of the adherend member after the first heating step.

4. The bonding method according to claim 1, wherein
the first heating step includes heating the adherend member using a near-infrared lamp, and
the second heating step includes heating the adherend member by induction heating.

5. The bonding method according to claim 2, further comprising a uniformization step of uniformizing a temperature of the adherend member after the first heating step.

6. The bonding method according to claim 2, wherein
the first heating step includes heating the adherend member using a near-infrared lamp, and
the second heating step includes heating the adherend member by induction heating.

7. The bonding method according to claim 3, wherein
the first heating step includes heating the adherend member using a near-infrared lamp, and
the second heating step includes heating the adherend member by induction heating.

8. The bonding method according to claim 5, wherein
the first heating step includes heating the adherend member using a near-infrared lamp, and
the second heating step includes heating the adherend member by induction heating.

* * * * *